Aug. 10, 1965  G. VENDRYES ETAL  3,200,045
LIQUID COOLED NUCLEAR REACTOR WITH IMPROVED
FLOW DISTRIBUTION MEANS
Filed Dec. 26, 1961  6 Sheets-Sheet 1

INVENTORS
GEORGES VENDRYES
JACQUES DUPORT
BY
Bacon & Thomas
ATTORNEYS

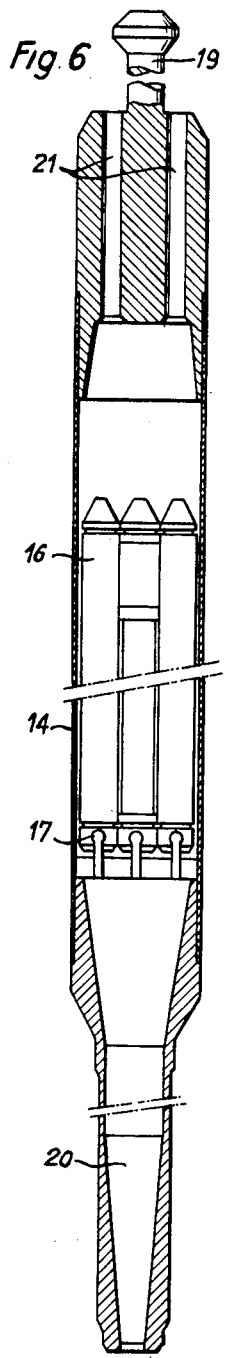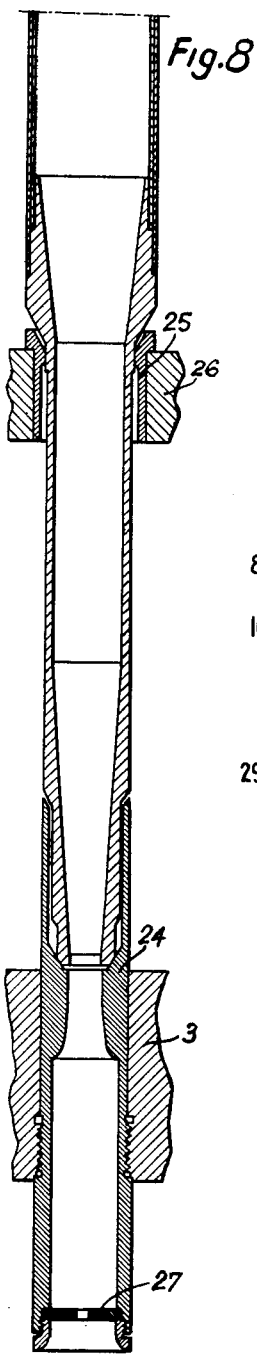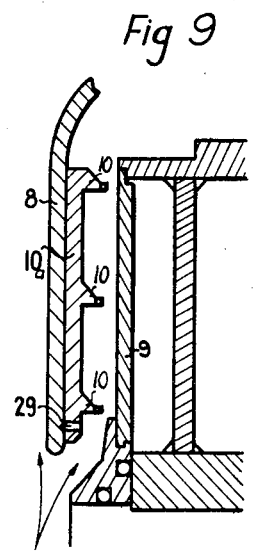

INVENTORS
GEORGES VENDRYES
JACQUES DUPORT
ATTORNEYS

INVENTORS
GEORGES VENDRYES
JACQUES DUPORT
BY
ATTORNEYS

United States Patent Office 3,200,045
Patented Aug. 10, 1965

3,200,045
LIQUID COOLED NUCLEAR REACTOR WITH IMPROVED FLOW DISTRIBUTION MEANS
Georges Vendryes, Gif-sur-Yvette, and Jacques Duport, Grenoble, Isere, France, assignors to Commissariat à l'Energie Atomique, Paris, France
Filed Dec. 26, 1961, Ser. No. 162,132
Claims priority, application France, Mar. 10, 1961, 855,306, 855,308
6 Claims. (Cl. 176—40)

The present invention relates to nuclear reactors and in particular to nuclear reactors which are cooled by circulation of liquid metal.

The use of a liquid metal as a heat-transferring cooling fluid is particularly beneficial in reactors which have a high specific power, especially fast-neutron breeder reactors in which the metal chosen is frequently sodium on account of its neutronic properties. In these reactors the specific power is not equal over the whole neutronic portion and it is preferable to provide different rates of flow of heat-transferring fluid according to the region of the reactor which is to be cooled.

In particular, the neutronic portion of a breeder reactor is divided into concentric regions, the central region being the seat of a heat evolution which is much more intense than in the peripheral regions, which results in the need to provide for a much more powerful cooling of the center where the fuel material proper is located. The peripheral regions are constituted by a mantle or blanket of fertile material which serves for the regeneration of the nuclear fuel, and the evolution of heat therein is considerably less; the heat evolution of which the fertile elements are the seat is not negligible, however, and the cooling of the peripheral regions must consequently be ensured.

The fuel elements or fertile elements are disposed inside vertical tubes which are open at both ends and through which a coolant circulates at a rate of flow which is in proportion to the heat evolution of the said elements. The parts which are thus grouped together constitute what is conventionally referred to as an assembly (or subassembly). The central assemblies are supplied in common and the rate of flow in each central assembly is regulated by means of a diaphragm which is disposed at the bottom portion of the assembly. The peripheral assemblies are supplied in common and the rate of flow in each peripheral assembly is also regulated by means of a diaphragm. The substantial difference in rate of flow between the central assemblies and the peripheral assemblies results in the need to supply these two regions independently, and up to the present time, two main circuits which are completely independent have been employed for this purpose. But this solution is subject to a large number of drawbacks: it is necessary among other things to have two circulation pumps, two regulating systems and two piping systems.

The fuel material and fertile material are usually distributed in the annular cylindrical regions having a common axis of revolution or at least a common axis of symmetry of a high order corresponding to the axis of the reactor.

Inside the ring which is formed at the base of each cylindrical region, the coolant is distributed so as to supply the assemblies which open into said ring. The rates of flow in the assemblies which are grouped together in the same region must be the same. Under these conditions, it is advantageous to provide a tank having an axis of revolution or of longitudinal symmetry which coincides with the axis of the neutronic portion of the reactor. But if the tank is supplied with coolant axially from beneath, the presence of the inlet conduit for the coolant supply obstructs the suspension of the tank beneath the base thereof.

The present invention has for its object to effect by means of a single supply conduit a suitable distribution of the coolant between the different regions of a reactor which is designed to operate in a continuous manner at a power-level chosen from a wide power range.

A further object of the present invention is to construct a tank which is supplied axially through the bottom portion thereof, in which the point of coupling of the supply conduit with said bottom portion is adapted to withstand efforts which are compatible with the good mechanical strength of this latter, and in which the strict centering of the reactor core on the axis of the tank is ensured irrespective of the operating conditions.

There now follows below a description of the invention, which is given by way of example and not in any sense by way of limitation, taking the case of a fast-neutron breeder reactor which is cooled with molten sodium; but it is wholly obvious that the invention does not solely apply to this type of reactor, but to all heterogeneous reactors which are cooled by the circulation of a liquid having a high temperature and a low vapor pressure.

The description refers to the accompanying drawings, in which:

FIG. 4 is a transverse section of a fuel assembly at the level of the fuel "needle";

FIG. 5 is a transverse section of a fuel assembly at the level of the fertile "needle";

FIG. 6 is a longitudinal section of an assembly;

FIG. 8 is a longitudinal section of the foot of an assembly, showing the arrangement of the said assembly in the supporting grid;

FIG. 9 is a partial longitudinal section of the bottom portion of the tank of a reactor comprising a device in accordance with the invention;

Figure 1:
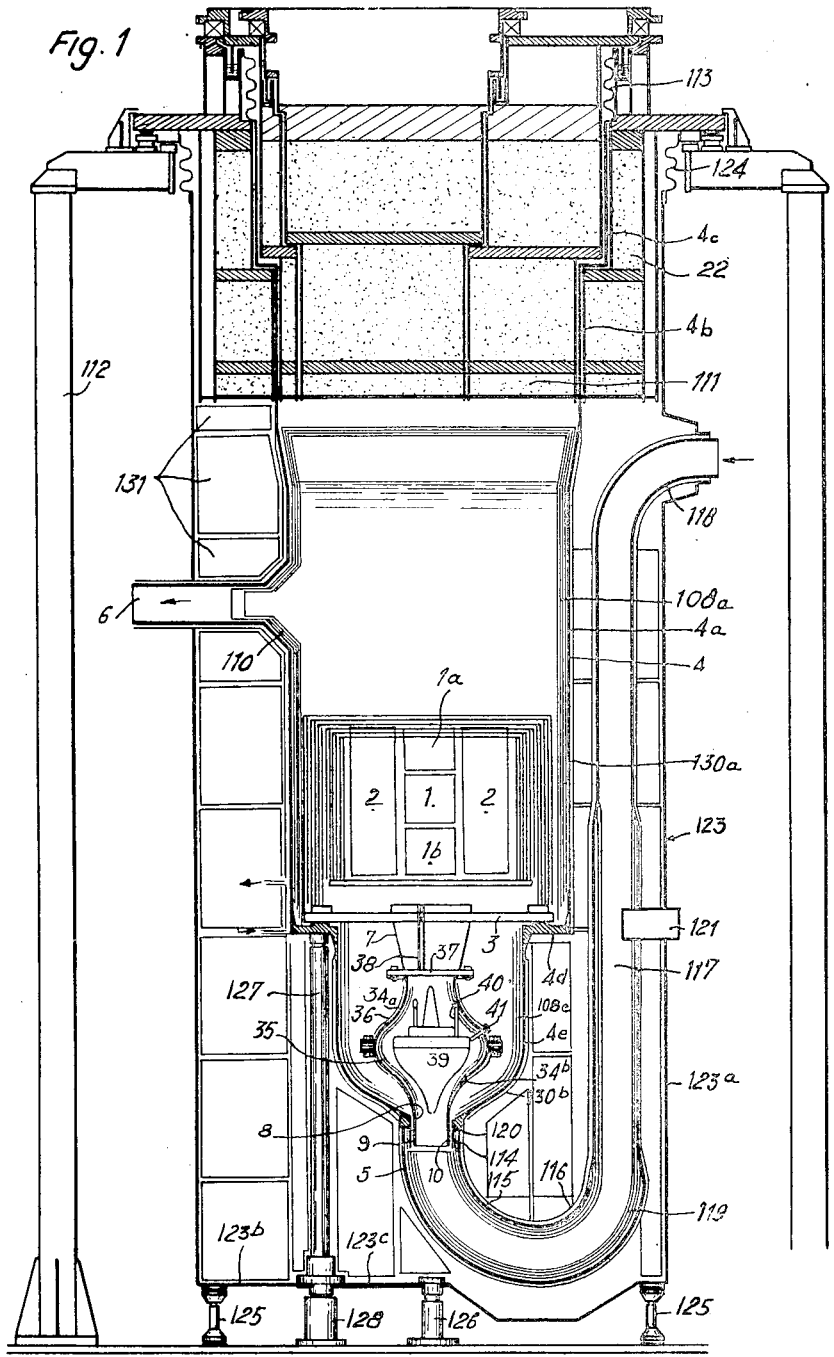
FIG. 1 is a sectional view of a nuclear reactor in accordance with the invention.

FIG. 1 shows the relative arrangement of the various elements of a breeder reactor which is cooled by liquid metal. The neutronic portion of the reactor comprises a central cylindrical portion 1, two axial blankets or blanket assemblies 1a and 1b, and an annular blanket or blanket assembly 2. The central portion, which has a hexagonal base, contains the fuel material proper, while the blankets contain the fertile material. In a breeder reactor, the fertile material serves essentially for the regeneration of plutonium. However, the nuclear reactions (fission and capture) which take place therein make a by no means negligible contribution to the energy released in the pile. It is therefore necessary to cool these reactions by a circulation of coolant (molten sodium in the present case), the rate of flow of which is, however, much lower than the rate of flow which is necessary for the cooling of the fuel proper.

In regions 1 and 2, the fuel material and fertile material are in the form of encased or canned "needles" which are grouped together inside tubes so as to constitute parallel assemblies. The said tubes are disposed vertically and the bottom ends thereof rest on a grid 3. They are open at both ends and corresponding holes in the grid 3 permit the flow of the molten sodium in the interior of each assembly.

The complete set of assemblies which constitute the core of the reactor is in contact with sodium in the liquid state contained in a tank 4. The said tank is supplied with relatively cold sodium at the bottom portion thereof through the conduit 5. One or a number of evacuation conduits such as the conduit 6 which are provided at the top portion of the tank convey the hot sodium to heat exchangers (not shown in the drawings), the sodium then returning from the heat exchangers to the reactor through the conduit 5 after purification if necessary.

In accordance with the present invention, the distribution of molten sodium between the assemblies of the regions 1 and 2 is effected by supplying the inlet orifices of the assemblies forming region 1 by means of a conduit 7 forming an extension of a sleeve 8, said sleeve 8 being in turn fitted inside a sleeve 9 which is coupled to the conduit 5, while the assemblies which constitute region 2 are supplied through the intermediary of the escape through an annular clearance between the sleeves 8 and 9. One or a number of diaphragms such as the diaphragm 10, which are suitably disposed in the above-mentioned annular clearance, regulate the ratio of the rates of flow in regions 1 and 2 in such manner as to obtain the desired cooling of the neutronic portion of the reactor.

The structure of the tank 4 will be described below in detail. It suffices to note at present that, since the sleeve 8 is suspended from the grid 3 by means of the conduit 7, no fixation element impairs the symmetry of flow in the vicinity of the escape. Moreover, inasmuch as the two sleeves are concentric, the expansions of the members to which the said sleeves are rigidly coupled have little influence on the escape flow rate. The use of the diaphragms 10 makes it possible to modify the escape flow curve as a function of the difference in pressures on the upstream side and downstream side, and further makes it possible to provide a relatively substantial mechanical clearance in spite of a low rate of flow. This substantial mechanical clearance facilitates the fitting of the sleeves one inside the other.

The present invention has been the subject of an application to a fast-neutron breeder reactor having a power level of 20 mw. of heat, the main characteristics of which are given below by way of non-limitative examples.

The fuel material is in the form of "fuel rods" 5.70 mm. in diameter and 400 mm. long. The fertile material is present in the form of "fertile rods," the dimensions of which are:

15.10 mm. in diameter and 480 mm. in height in respect of the radial blanket assembly which constitutes the annular region 2, 13.10 mm. in diameter and 200 mm. in height in respect of the top axial blanket assembly 1a and the bottom axial blanket assembly 1b which are provided respectively at the top portion and bottom portion of region 1.

The fuel rods and fertile rods are enclosed in cans of stainless steel or of niobium which are in contact with the cooling sodium.

Figure 2:
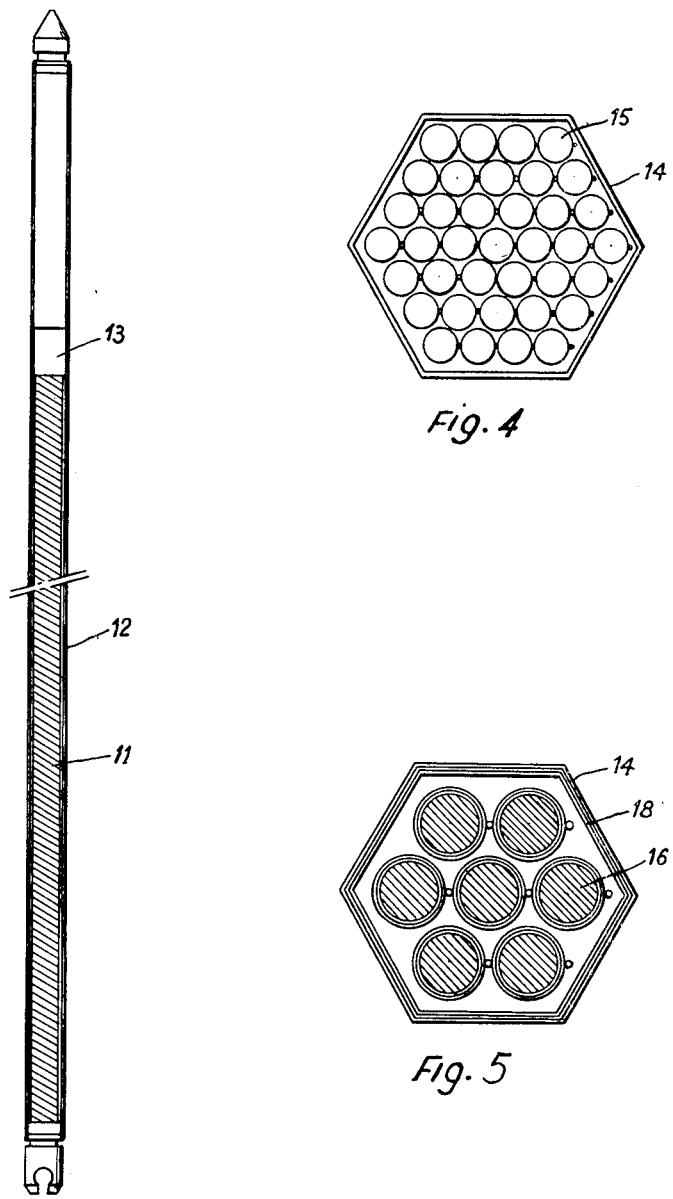
FIG. 2 is a longitudinal section of a fuel "needle"

FIG. 2 shows a fuel rod 11 enclosed in its can 12 constituted by a stainless steel tube which is closed at both ends thereof. This unit forms a "fuel needle." Similarly, a fertile rod enclosed in a stainless steel tube which is closed at both ends constitutes a "fertile needle."

The rods are free inside their can and the transfer of heat is carried out by means of a liquid bond of sodium or of sodium-potassium, the continuity of which is carried into effect over the entire surface of the rod.

Inasmuch as the coefficients of thermal expansion of the fuel rods and fertile rods and of the liquid bond are different from that of stainless steel, each fuel needle and fertile needle is provided at the top portion thereof with an expansion chamber 13 which is intended to be filled with helium, thereby permitting of the free differential expansions of the various materials in the interior of the needle elements.

For reasons of handling and mechanical strength, the fuel needles and fertile needles are grouped together in bundles so as to constitute the assemblies.

The fuel assemblies which serve to constitute the central region 1 of the neutronic portion of the reactor are distinguished from the fertile assemblies which serve to constitute the radial blanket corresponding to the peripheral region 2.

Figure 3:
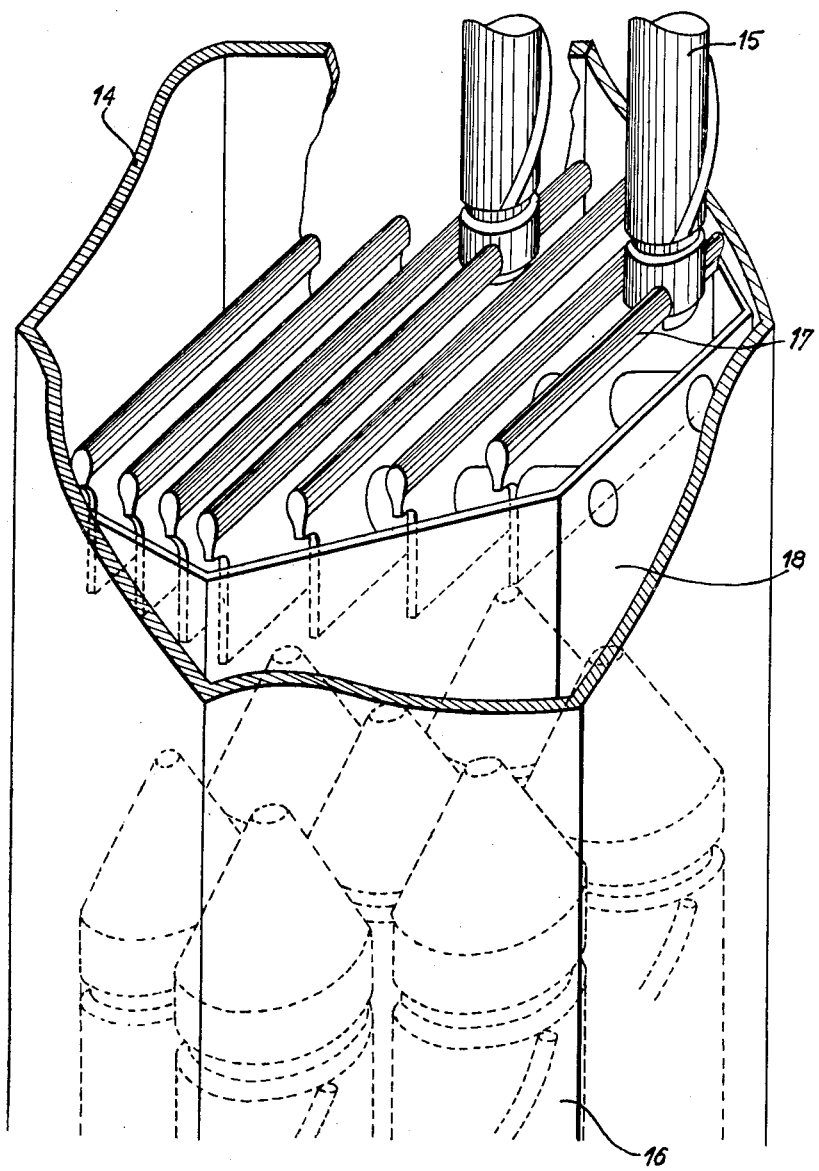
FIG. 3 is a partial view in perspective of the interior of a fuel assembly.

A fuel assembly is illustrated in FIG. 3. The casing of the assembly is constituted by a tube 14 of hexagonal section inscribed in a circular cylinder approximately 5 cms. in diameter and approximately 110 cms. in height.

A tube of this type contains three bundles of needle elements located one above the other:

At the center, a bundle 15 of fuel needles corresponding to the core 1 of the pile;

Above and below, a bundle 16 of fertile needles corresponding respectively to the top axial blanket assembly 1a and the bottom blanket assembly 1b.

A wire arranged in a spiral around each needle maintains the space which is necessary for the circulation of sodium.

In order to permit of their free expansion, the needles are secured only at the bottom portion which slides on parallel rails 17 forming a grid having a hexagonal outline. The grids are attached to hexagonal tubes 18 which enclose the needles of the axial blanket assemblies without extending into the center of the reactor.

FIG. 4 shows a cross-section of a fuel assembly at the level of the core 1 of the reactor. The said fuel assembly contains 37 fuel needles.

FIG. 5 shows a cross-section of a fuel assembly at the level of the axial blanket assemblies 1a or 1b.

A fertile assembly appears outwardly in a form which is identical to that of a fuel assembly, but contains only a single bundle of seven fertile needles and the section of said fertile assembly is identical to that which is illustrated in FIG. 5.

FIG. 6 shows a cross-section of a fertile assembly. Each fuel assembly or fertile assembly terminates at the top thereof in a head 19 and at the bottom portion thereof in a foot 20. The head is essentially intended for the handling of the assembly and comprises the cooling sodium exits 21; the foot is essentially intended for the fixation of the assembly in the reactor and comprises an inlet passage for the cooling sodium.

Small plates fixed on the faces of the hexagonal tube 14 serve to maintain a certain spacing between the faces of two adjacent assemblies.

Stainless steel is employed as the structural material of the fuel assemblies and fertile assemblies both in the case of the hexagonal tubes as well as in the case of the heads, feet, grids, etc.

Figure 7:
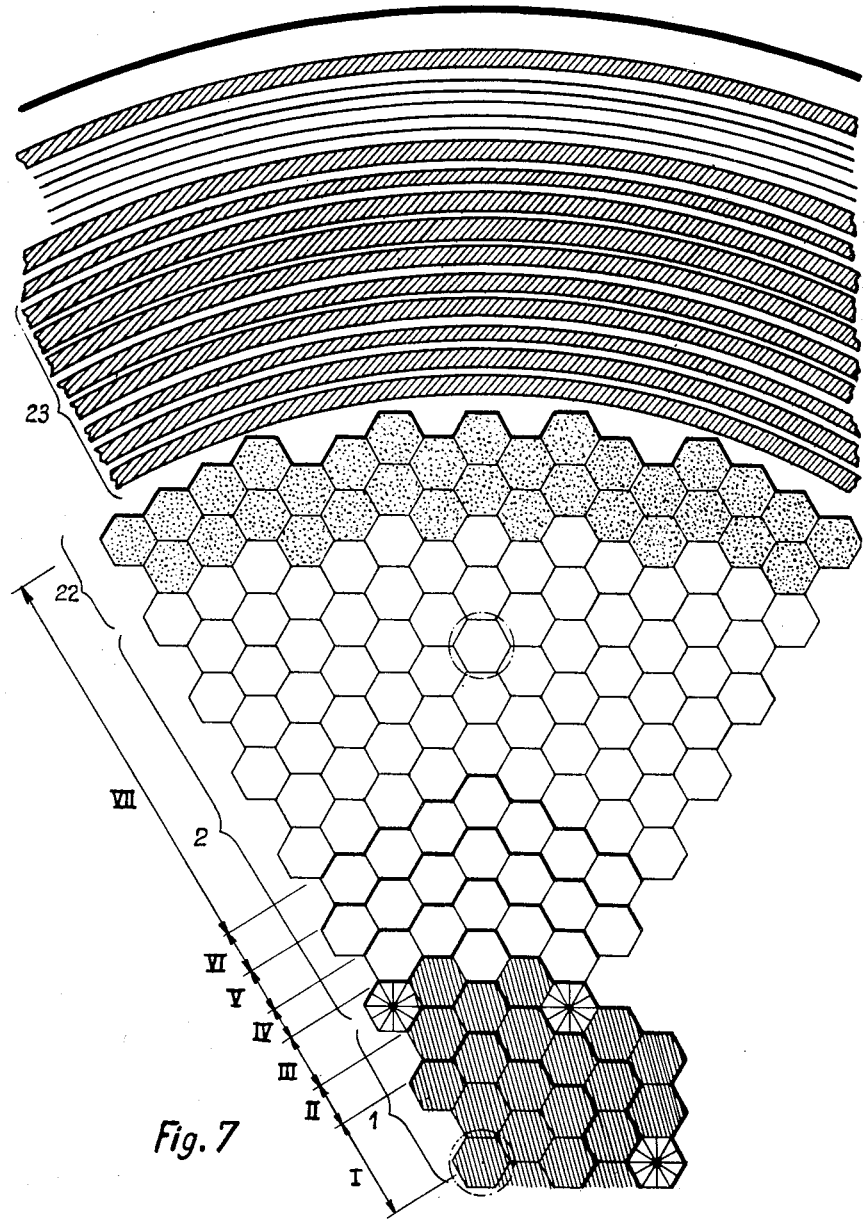
FIG. 7 is a schematic and partial transverse section of the neutronic portion of the reactor at the level of the assemblies.

A fraction of the neutronic portion of the reactor is illustrated in FIG. 7 in a cross-section taken along the horizontal mid-plane. The said fraction is composed, in the radial direction, of a series of different regions which are all in contact with the sodium in circulation.

The central region 1 is taken up by the juxtaposition of 53 vertically disposed fuel assemblies. This region has been illustrated in the form of shaded assemblies.

Around said central region, the radial blanket 2 is constituted by the juxtaposition of 500 vertically disposed fertile assemblies.

Around the radial blanket is disposed a reflector. This letter is constituted by an internal portion 22 which can be taken apart and which is formed by the juxtaposition of 186 assemblies of stainless steel having a shape which is identical to that of the fuel assemblies and fertile assemblies, and by an outer portion 23 which cannot be taken apart and having a height at least equal to that of the assemblies. The portion which cannot be dismantled can be constituted by steel sheets separated by spaces for the liquid sodium.

The erection is carried out in such manner that the assemblies are arranged in rings fitted together, each ring being formed by a group of assemblies which are approximately equidistant from the axis of the reactor. The first ring is limited to the central assembly. The 17 rings thus defined are not illustrated in the figure. The central region (core and axial blankets) takes up the first five rings, while the fifth ring is incomplete; the radial blanket takes up the rings from the sixth to the fifteenth; the inner portion of the reflector takes up the sixteenth and seventeenth rings.

As has previously been indicated, the specific power at any given point of the core or of the blanket varies according to the position of the point considered. The heat to be removed from an assembly varies with the position of said assembly with respect to the axis of the reactor.

Accordingly, the maximum specific power released in the core of the reactor is 264 kw./dm.$^3$. In the core as a whole, the mean specific power is 165 kw./dm.$^3$. The corresponding specific power ratings in respect of the radial blanket are : 31.3 kw./dm.$^3$ and 2.18 kw./dm.$^3$.

For reasons of construction, the continuous regulation of rates of flow of sodium in each region is not possible and a subdivision in zones is called for.

As regards the choice of zones, it is considered that the velocities of the sodium in one zone are practically the same at all points of a horizontal plane. The velocity in one zone being constant, the rise in temperature of the sodium will be at maximum value in the region of that zone which is nearest to the axis of the reactor; due allowance being made for a possible eutectic formation between the rod and the can, the most critical temperature in the reactor is that of the hottest point of thermal bond. This results in the need to impose two distinct maximum temperatures in respect of the thermal bonds of the fuel needles and fertile needles; inasmuch as the difference between the maximum temperature of the thermal bond and the maximum temperature of the cooling sodium of the same needle is relatively small, the limitation is made to apply to the maximum temperature of the sodium.

The condition of maximum temperature as defined above makes it necesary to adopt a maximum temperature of the sodium which is constant in the different zones of the central region, and a maximum temperature of the sodium which is constant in the different zones of the peripheral region and which is higher than the former by 50°C.

Another result sought is that the difference between the maximun temperature and the mean temperature in each zone be as small as possible. This consideration results in the need to constitute certain zones of a single ring, such as the zones II, II, IV, V and VI. On the other hand, the three central rings are grouped together in a single zone, namely zone I; a more extensive subdivision would result in very small differences in the rates of flow of the sodium. In that region which is furthest away from the center, the consideration of minimum flow results in the need to group together in a single zone, namely, zone VII, the assemblies of the nine peripheral rings including the inner portion of the reflector and the peripheral assemblies of the radial blanket, starting from that ring in which the minimum flow corresponds to that which is strictly necessary for the removal of heat, while at the same time respecting the limit which has been set for the maximum temperature of the sodium.

The conduit 7 of FIG. 1 supplies in common the feet of the assemblies of zones I, II, III, and IV; the assemblies of zones V, VI and VII constitute the peripheral region; these latter are supplied with sodium by means of the escape. In each particular zone, unitary diaphragms are fitted in the foot of each assembly for the purpose of regulating the flow in the assemblies of said zone.

It is preferably to constitute the grid which supports the assemblies in two parts: a central portion constituted by a hexagonal plate 3a in which are grouped together the apertures corresponding to the asemblies of zones I, II, III and IV, and a ring corresponding to zones V, VI and VII. The conduit which supplies sodium to the central region is directly fixed to and supported by the central plate of the grid.

FIG. 8 shows the foot 20 of an assembly. This foot fits into a diaphragm-holder sleeve 24 which is fixed on the grid. The assembly is held in the vertical position by means of a sleeve 25 which is fixed on a plate 26, the openings of which correspond to those of the grid.

A cylindrical bearing surface permits the assembly to slide inside the sleeve 25 while the foot comprises at the bottom portion thereof a spherical bearing surface which rests on a conical surface of the diaphragm-holder 24. The diaphragm which controls the rate of flow in the assembly is disposed at 27 at the bottom portion of the diaphragm-holder. The sodium penetrates into the diaphragm-holder, through the diaphragm 27, passes through a venturi tube and is admitted into the assembly. The shapes of the assembly foot and of the venturi tube are appropriately designed for the purpose of reducing the component of the vertical force applied against the assembly in consequence of the admission of sodium at the base thereof.

The calibrated diaphragms which regulate the flow of sodium in the various assemblies are coupled to the grid. The formula which would have consisted in coupling these openings to the assemblies themselves would have given greater flexibility to the operation of the reactor but is subject to a serious danger: any assembly which is erroneously fitted in position in the place of another could be badly cooled.

FIG. 9 shows in central cross-section the region in which there takes place the escape of liquid sodium intended for the purpose of supplying the peripheral region of the reactor. The sleeves 8 and 9 and the diaphragms 10 are again shown in this figure. In this arrangement, the said diaphragms 10 are fitted on the sleeve 8 and are constituted by flanges of a ring 10a of a strong material which is substantially insensitive to corrosive attack by the molten metal employed. Each flange comprises a plane face on the upstream side terminating in a sharp ridge and a conical face on the downstream side. The sharpness of the upstream ridge is of great importance, since it is this sharpness upon which the contraction of the fluid stream partly depends, and the diaphragms produce effects which can be reproduced only insofar as said diaphragms are machined to a very fine tolerance. In particular, the ridges must have neither any burrs nor any chamfers; they must be ground with a grindstone and checked with a magnifying glass.

In order to lessen the dangers of cavitation, it can be an advantage to subject the diaphragms located upstream to a pressure which is less than that which is downstream. It has been found preferable in the particular arrangement which is illustrated in FIG. 9 to provide different diaphragms.

The arrangement of the diaphragms, the shape and number of these latter, the geometry of the assemblies and of the orifices located at the bases thereof are all variables which have an effect on the relative rates of flow of the central and peripheral regions. In the case of a reactor which is intended to operate with variable power, it is necessary that the ratio of rates of flow should remain constant. In the case of the particular form of embodiment which has been contemplated, this result has been obtained by means of three diaphragms. A series of screws 29 lock the ring 10a.

The inner sleeve 8 is suspended from the central portion of the grid through the intermediary of what is conventionally referred to as a "balloon" which preserves the symmetry of revolution of the complete unit and contributes to a satisfactory flow.

The balloon is in two parts 34a and 34b which are assembled together in the plane of maximum cross-section and which are fitted with internal thermal shields 35 and external thermal shields 36. The portion 34a is bolted to an upper plate 37 into which are screwed tubes such as the tube 38, each of which corresponds to one assembly of the central region of the neutronic portion of the reactor and is screwed into the hole which is provided for said assembly in the grid 3, as shown in FIG. 8.

In the interior of said balloon is disposed a bulb or recuperator 39. This device has a double function. In the first place, it ensures a good distribution of the velocities of flow of the sodium both at the inlets of the tubes 38 and in the balloon. In the second place, it recovers the molten fuel which is liable to flow from the central region of the reactor in the case of accident, thereby preventing the formation of a mass which is greater than the critical mass.

The interior of the bulb (which has not been illustrated in the drawings) is formed by an assembly of metallic sheets fitted on a vertical central rod. The interior is lined with a metallic casing which exactly corresponds to the shape desired. The top face of the bulb forms two annular vessels having pre-determined capacities. At the center of the top portion is located a conical member which is screwed on to the central rod and is intended to assist the distribution of the molten fuel and the outflow thereof. The bulb is suspended in the balloon by means of three tie-rods 40 which are secured to the portion 34a. A system of screws, only one of which is illustrated at 41, provides a means of centering the bulb inside the balloon.

The supporting bracket which is illustrated schematically at 121 partially supports the weight of the supply conduit at the height of the leakproof tank which is assumed to be fixed, while nevertheless permitting the free play of the vertical and transverse expansions and while reducing to a small value the reaction of said expansions on the leakproof tank.

Figure 10:
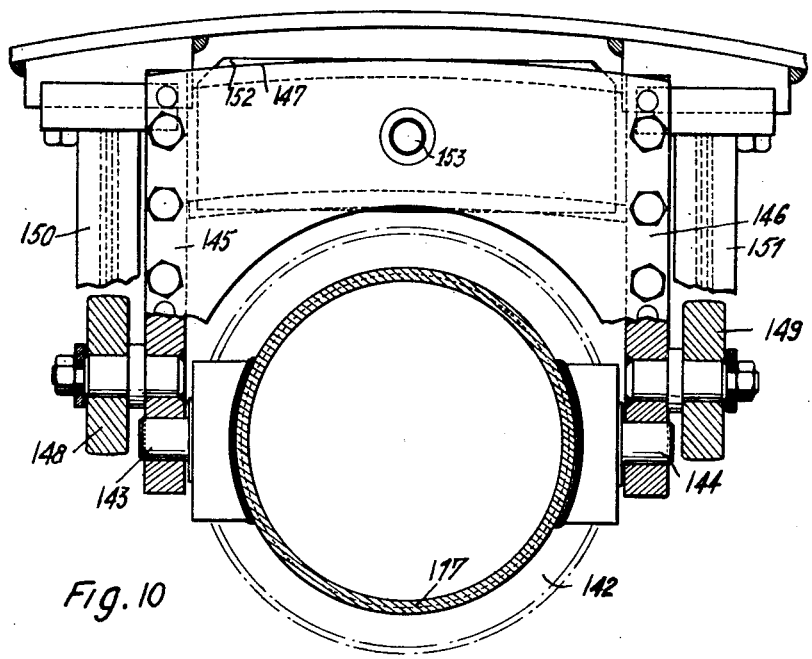
FIG. 10 is a horizontal sectional view of a first form of embodiment of the supporting bracket which relieves the coolant supply conduit.

A first example of an embodiment of the supporting bracket is illustrated in FIG. 10: a sleeve 142 arranged on the vertical portion 117 of the supply conduit is provided with two diametrically opposite journals 143 and 144. Said journals are adapted to rotate in levers 145 and 146 which are coupled together by means of a cross-piece 147. A roller 148 is mounted on the lever 145 between the journal shaft 143 and the cross-piece 147. Similarly, the roller 149 is mounted in the same manner on the lever 146. The two rollers referred to above are adapted to roll respectively on plates 150 and 151. Said plates are supported by a double bracket which is attached to the safety tank after having been adjusted for height. A counterweight 152 is mounted by means of a vertical rod 153 which is supported on a spherical bearing at the center of the cross-piece 147.

The slight vertical expansions of the safety tank starting from the base-plane of this latter are compensated by the rocking motion of the levers 145 and 146. The more substantial tranverse expansion of the supply conduit causes the rollers to roll on the plates 150 and 151. The vertical balancing reaction is pre-determined by the counter-weight and has a constant value. The horizontal reaction on the leakproof tank results from the rolling resistance of the rollers and from the devices which may be provided for guiding the conduit; this reaction can be limited to a relatively small value.

Figure 11:
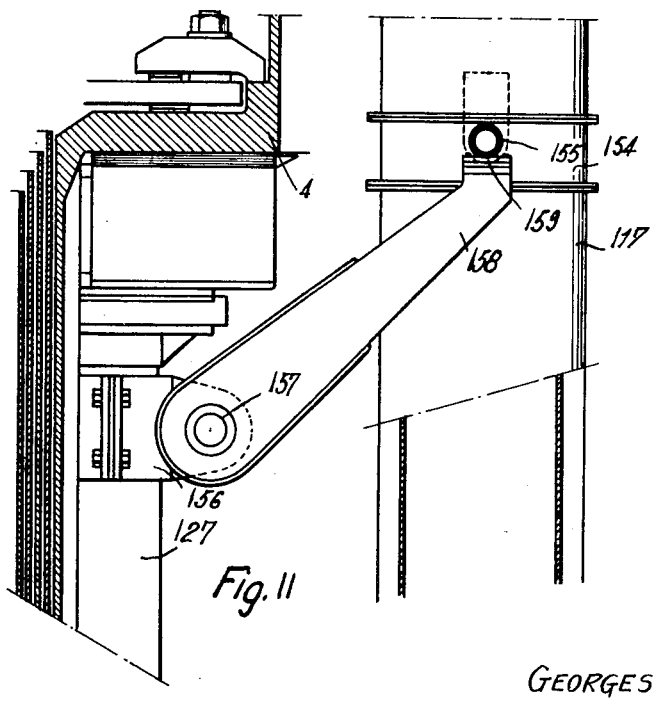
FIG. 11 is a view in profile of a supporting bracket in accordance with a second form of embodiment.

FIG. 11 illustrates a view in elevation and partial cross-section of a supporting bracket in accordance with another form of embodiment in which a torsion rod is employed for the purpose of relieving the supply conduit. In this figure, there is shown in cross-section the ring 4d of the leakproof tank, the supporting pillar 127 and the vertical portion 177 of the conduit. A sleeve 154 which is attached to the conduit at the level of the ring 4d is fitted with two diametrically opposite rollers, of which only one roller 155 can be see in FIG. 11. A sleeve 156 which is rigidly fixed to the pillar 127 holds a torsion rod 157 at the center thereof and prevents this latter from turning. At each extremity of said torsion rod is disposed a lever 158 which terminates in a roller track. Thus the lever 158 which terminates in the roller track 159 is attached to the extremity of the rod 157 which can be seen from the the end in the figure. Both roller tracks as thus constituted serve as supports for the rollers of the sleeve 154. When resting on said roller tracks, the rollers are subjected to a movement of thrust in dependence on the torsion of the rod 157 and thus permit the horizontal displacements of the conduit.

Among the advantages of a tank in accordance with the present invention have been mentioned the ease of erection and dismantling of the combined reactor assembly. By way of indication, reference is made below to the sequence in which the assembly is carried out in the course of construction. When once the flooring is laid and the jacks supporting the safety tank rest thereon, the procedure is then to assemble the frame which serves as a support for the upper enclosures. The elements of the safety tank are then assembled and the pillar supporting the leakproof tank are mounted in position as well as the supporting bracket and the supply piping system. The annular plug between the safety tank and the leakproof tank is then fitted. The pressure shell then the upper barrel-plates of the leakproof tank are brought on to the pillars and the connections to the evacuation and supply conduits are formed immediately afterwards. When the conduits and the tank are in position, the thermal shields of the pressure shell are inserted, the grid ring is brought down, followed by the assembled unit of the central portion of the grid of the balloon and recuperator. At this moment is effected the centering of the sleeves between which is formed the escape intended to supply the peripheral assemblies. The opening formed in the safety tank serves to insert and place the casings which are disposed between the two tanks. The erection of the reactor continues with the fitting in position of the thermal shields of the upper barrel-plates of the leakproof tank and of the neutronic reflectors, and then the top enclosure of the leakproof tank. It is quite obvious that neutronic and thermal shields are to be provided outside the safety tank; these latter are unrelated to the invention, however, and have not been illustrated in the drawings.

We claim:

1. A nuclear reactor, comprising: a liquid-tight tank; an inlet pipe connected to said tank for supplying a liquid coolant thereto; an outlet pipe connected to said tank for withdrawing coolant therefrom; a first plurality of elongated bodies centrally mounted within said tank and containing fissile material therein, each of said elongated bodies being provided with passage means for the flow of liquid coolant therethrough; a second plurality of elongated bodies mounted within said tank in radially outward relation with respect to said first plurality of elongated bodies and each being provided with passage means for the flow of liquid coolant therethrough; flow restrictor means mounted in the paths of flow through at least some of said passage means; annular baffle means mounted in the path of flow through said inlet pipe at a point upstream of said first and second plurality of elongated bodies for dividing the flow of liquid coolant from said inlet pipe into two separate coaxial inner and outer liquid flow paths and for directing the respective paths divided thereby into the passages of the first and second elongated bodies, respectively; and throttling means positioned in one of said divided flow paths to control the relative rate of flow between said inner and outer flow paths.

2. A nuclear reactor as defined in claim 1 wherein said throttling means comprises at least one annular restriction member disposed in said outer liquid flow path.

3. A nuclear reactor as defined in claim 1 wherein said tank comprises an upper cylindrical portion, a stationary anchor portion directed radially inward therefrom and supporting said upper portion, and a lower bell-shaped portion secured to said anchor portion along its inner edges, said inlet pipe having an axially directed terminal portion connected to the bottom of said lower part.

4. A nuclear reactor as defined in claim 3 wherein said inlet pipe is provided along the length thereof with 180° bend terminating in a straight vertical portion supported by yieldable anchor means secured thereto at substantially the same level as the anchor portion of said tank.

5. A nuclear reactor as defined in claim 4 wherein said anchor means comprises a stationary member supporting the weight of said inlet pipe by means of a mechanical linkage permitting vertical and transverse movement of said pipe with respect to said stationary member.

6. A nuclear reactor as defined in claim 1 including a bulb member positioned within said annular baffle means and being open at its upper end in the direction of said first plurality of elongated bodies.

References Cited by the Examiner

UNITED STATES PATENTS

| 2,841,545 | 7/58 | Zinn _____ | 176—18 |
| 3,011,962 | 12/61 | Koch et al. _____ | 176—28 |
| 3,041,263 | 6/62 | Kiehn et al. _____ | 176—14 |
| 3,054,741 | 9/62 | Tatlock et al. _____ | 176—30 |
| 3,060,111 | 10/62 | Sherman et al. _____ | 176—61 |

FOREIGN PATENTS

| 879,902 | 10/61 | Great Britain. |

CARL D. QUARFORTH, *Primary Examiner.*